United States Patent
Reeves

(10) Patent No.: US 11,448,912 B2
(45) Date of Patent: Sep. 20, 2022

(54) CURVED DISPLAY AND SENSOR DEVICES

(71) Applicant: Flexenable Limited, Cambridge (GB)

(72) Inventor: William Henry Reeves, Cambridge (GB)

(73) Assignee: Flexenable Limited, Cambridge (GB)

( * ) Notice: Subject to any disclaimer, the term of this patent is extended or adjusted under 35 U.S.C. 154(b) by 0 days.

(21) Appl. No.: 16/757,059

(22) PCT Filed: Oct. 18, 2018

(86) PCT No.: PCT/EP2018/078603
§ 371 (c)(1),
(2) Date: Apr. 17, 2020

(87) PCT Pub. No.: WO2019/077061
PCT Pub. Date: Apr. 25, 2019

(65) Prior Publication Data
US 2020/0341323 A1    Oct. 29, 2020

(30) Foreign Application Priority Data
Oct. 20, 2017 (GB) ...................... 1717278

(51) Int. Cl.
*G02F 1/1333* (2006.01)
*G02F 1/1335* (2006.01)

(52) U.S. Cl.
CPC .... *G02F 1/133305* (2013.01); *G02F 1/13338* (2013.01); *G02F 1/133308* (2013.01); *G02F 1/133528* (2013.01); *G02F 1/133331* (2021.01); *G02F 2201/503* (2013.01)

(58) Field of Classification Search
None
See application file for complete search history.

(56) References Cited

U.S. PATENT DOCUMENTS

| 2004/0180476 | A1  | 9/2004  | Kazlas et al. |
| 2013/0321740 | A1* | 12/2013 | An ............ H05K 5/02 |
|              |     |         | 349/58 |
| 2016/0174423 | A1  | 6/2016  | Oh et al. |
| 2017/0241039 | A1  | 8/2017  | Takai |

FOREIGN PATENT DOCUMENTS

EP    3296808 A1    3/2018

OTHER PUBLICATIONS

International Search Report and Written Opinion from International Patent Application No. PCT/EP2018/078603, dated Dec. 19, 2018.
Search Report from Great Britain Patent Application No. 1717278.4 dated May 1, 2018.

* cited by examiner

*Primary Examiner* — Phu Vu
(74) *Attorney, Agent, or Firm* — Dergosits & Noah LLP; Todd A. Noah

(57) ABSTRACT

A manufacturing process for forming a flexible assembly suitable for a curved sensor or display including a stack of layers defining electrical control circuitry is presented. The flexible assembly has a curved configuration and comprises at least first and second components (4, 8) laminated together in a stressed configuration due to their curvature. While the assembly is in said curved configuration at least the first and second components (4, 8) are cut to obtain one or more edges which are aligned to each other.

19 Claims, 1 Drawing Sheet

CURVED DISPLAY AND SENSOR DEVICES

This patent application is a U.S. National Phase of International Patent Application No. PCT/EP2018/078603, filed Oct. 18, 2018, which claims priority to Great Britain Patent Application No. 1717278.4, filed Oct. 20, 2017, each of which is incorporated by reference in its entirety.

Curved devices, such as curved display and/or sensor devices, are of increasing interest. Display and sensor devices comprise a stack of layers defining electrical control circuitry, such as active matrix control circuitry, and the technology to build this stack of layers on a flexible plastic support film provides the possibility to form display and sensor devices having curved configurations.

The production of a curved device may comprise laminating flexible components together, and the inventor for the present application has carried out work in relation to improving the mechanical stability of curved devices produced in this way.

There is hereby provided a method, comprising: forming a flexible assembly including a stack of layers defining electrical control circuitry for a sensor or display, wherein the flexible assembly has a curved configuration and comprises at least first and second components laminated together in stressed configurations; and while the assembly is in said curved configuration, cutting through at least said at least first and second components to produce one or more aligned edges in the said at least first and second components.

According to one embodiment, forming the assembly comprises laminating said first component to a third flexible component in a curved configuration, and then laminating said second component to said first component in situ on the third component.

According to one embodiment, forming the assembly comprises laminating said first component to said second component, and laminating the first component to a third component in a curved configuration, with the second component laminated to the first component.

According to one embodiment, said cutting comprises cutting through also the third component.

According to one embodiment, said third component comprises a flexible window/cover component.

According to one embodiment, the assembly comprises a liquid crystal cell interposed between two orthogonal polariser films.

According to one embodiment, said first and second components comprise two encapsulation films between which the liquid crystal cell and polariser films are interposed, and wherein the cutting comprises cutting at least through the two encapsulation films and the window/cover component to produce aligned edges in at least the two encapsulation films and the window/cover component.

Embodiments of the present invention are described in detail hereunder, by way of example only, with reference to the accompanying drawings, in which.

An embodiment of the present invention is described below for the example of a liquid crystal display (LCD) device without a touch sensor, but the same kind of technique is also applicable to e.g. LCD devices including touch sensors, other types of display devices with or without touch sensors, and sensor devices (e.g. light/radiation sensors etc.) with or without any display function.

An embodiment of the present invention is described below for the example of cutting through a window/cover component and flexible encapsulation films in curved, stressed configurations, but the same kind of technique is also applicable to additionally cutting through other flexible, stressed components of a curved assembly, or cutting through other flexible stressed components without cutting through flexible encapsulation films, or cutting through stressed flexible components in an assembly not including flexible encapsulation films.

Figure 1:
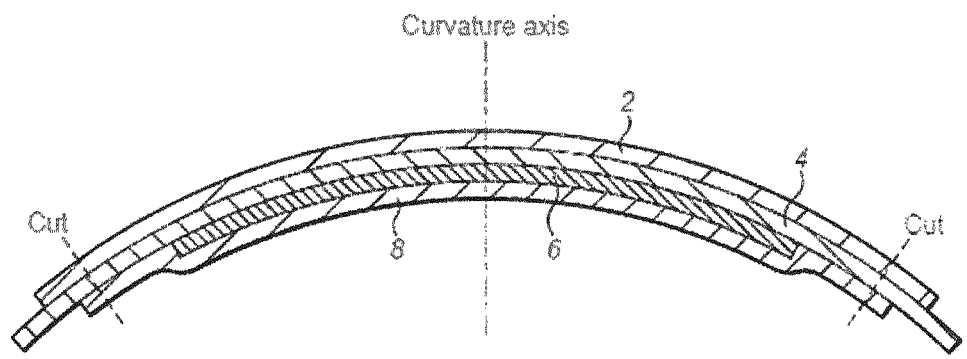
FIG. 1 illustrates a curved assembly for a display device prior to cutting according to an embodiment of the present invention.

The example of FIG. 1 involves laminating a plurality of flexible, plastics film components (either in succession or in combination) to a curved window/cover component 2, which forms the outer screen in the finished display/sensor device. The plastics film components each comprise at least one plastics film. The least at one plastics film may itself be a functional element, and/or may support one or more functional elements.

The curved window/cover component 2 may, for example, comprise a flexible plastic support film that, in this embodiment, adopts a curved resting configuration in the absence of any applied external mechanical force; and tends to return to that curved resting configuration when flexed away from the resting configuration. Such a window/cover component 2 may, for example, be produced by applying one or more desired coatings (e.g. scratch-resistant coating, anti-glare coating etc.) to a flexible plastic film in a flat resting configuration, and then moulding the plastic film into the desired new curved resting configuration by e.g. a thermoforming technique. When the window/cover component 2 is forcibly flexed away from its curved, new resting configuration, internal stresses are generated within the window/cover component that act to return the window/cover component back to its curved resting configuration. Another example of a technique for producing a plastics window/cover component 2 with a curved resting configuration involves bonding one surface area of a first plastics film sub-component (e.g. hard-coated, planar acrylic sheet) to a smaller surface area of a second plastics film sub-component (e.g. another hard-coated planar acrylic sheet of the same thickness), by e.g. flexing one of the plastics film sub-components into a stressed curved configuration using a lamination aid, and bonding the other of the plastics film sub-components to it in situ on the lamination aid. This alternative technique yet further facilitates the production of curved window/cover component with a hard coating, without needing to coat a curved surface.

In the example of FIG. 1, the window/cover component 2 is supported on a curved surface of a rigid carrier (not shown) during the lamination processes. The flexible plastics film components laminated in stressed, curved configurations directly or indirectly to the thus supported curved window/cover component 2 include: a flexible encapsulation film 4 functioning as a barrier against the ingress of one or more damaging air species (e.g. moisture, oxygen etc.) via the plastic window/cover component 2; a flexible module 6 comprising two flexible, orthogonal linear polariser films laminated on opposite sides of a liquid crystal cell; and a second flexible encapsulation film 8 also functioning as a barrier against the ingress of one or more damaging air species.

The liquid crystal cell comprises a thickness of liquid crystal material sandwiched between two flexible support films secured together by adhesive, each of the two flexible support films supporting at least an alignment layer (e.g. a rubbed organic polymer layer such as e.g. a rubbed polyimide layer) for together controlling the state of the liquid crystal material (with regard to how the liquid crystal material rotates the polarisation of light) in the absence of an electrical field generated electrically within the liquid crystal material. In this example, the LCD device is an organic liquid crystal display (OLCD) device, which comprises an organic transistor device (such as an organic thin film transistor (OTFT) device) for the control component. OTFTs comprise an organic semiconductor (such as e.g. an organic polymer or small-molecule semiconductor) for the semiconductor channels. At least one of the two flexible support films sandwiching the liquid crystal material also supports a stack of layers (e.g. comprising metal layers, organic insulating layers, and one or more organic polymer semiconductor layers) defining electrical control circuitry (e.g. active matrix circuitry) for electrically controlling the state of the liquid crystal material in each pixel region (with regard to how the liquid crystal material rotates the polarisation of light).

In this example, the flexible module 6 comprises a set of three pre-prepared plastics film sub-components: a lower polarising filter component 132; a liquid crystal cell incorporating electrical control circuitry and a colour filter array, and pre-bonded to a chip-on-flex (COF) unit; and an upper polarising filter component 130. In this example, all three sub-components are prepared in respective substantially planar resting configurations and bonded together in their planar resting configurations, before bonding the bonded assembly to the curved window/cover component 2. According to one variation, the pre-prepared individual plastics film sub-components are bonded together in situ on the curved window/cover component 2. In more detail, each plastics film sub-component of the set of sub-components is bonded in sequence to the curved window/cover component 2, via any of the plastics film sub-component(s) that has already been bonded to the curved window/cover component 2. Each bonding may, for example, be achieved by a dry bond lamination technique.

Figure 3:
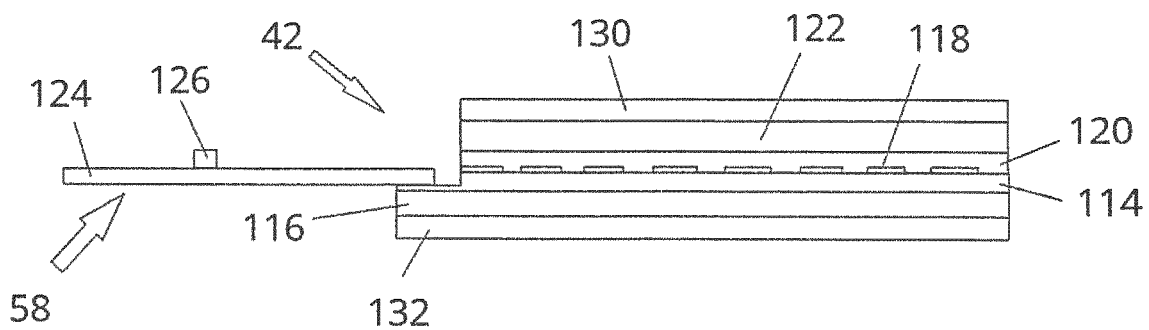
FIG. 3 illustrates an example of an optical modulator for the technique of FIGS. 1 and 2.

An example of the flexible module 6, 42 is schematically illustrated in FIG. 3. A stack 114 of conductor, semiconductor and insulator layers is formed in situ on a plastics support film 116. The stack 114 defines an array of pixel electrodes 118, and electrical circuitry for independently controlling each pixel electrode via conductors outside the array of pixel electrodes 118. The stack 114 may, for example, define an active matrix array of thin-film transistors, including: an array of gate conductors each providing the gate electrode for a respective row of TFTs, and extending to outside the array of pixel electrodes; and an array of source conductors each providing the source electrode for a respective column of TFTs, and extending to outside the array of pixel electrodes. Each pixel electrode is associated with a respective TFT, and each TFT is associated with a unique combination of gate and source conductors, whereby each pixel electrode can be addressed independently of all other pixels.

A substantially uniform thickness of liquid crystal material 120 is contained between the array of pixel electrodes 118 and a counter component 122 comprising an array of colour filters supported on another plastics support film. A COF unit 124 is bonded to a portion of the support film 116 outside the array of pixel electrodes 118 to create a conductive connection between (i) an array of conductors (e.g. source and gate addressing conductors) defined by the stack 114 in a region outside the array of pixel electrodes 118 and (ii) a corresponding array of conductors of the COF unit, which are connected to the terminals of one or more driver chips 126 forming part of the COF unit.

Each of the above-mentioned flexible components (i.e. encapsulations film 4, 8, polariser films 130, 132, and liquid crystal cell) may be laminated to the window/cover component 2 (directly or indirectly) either individually or in combination with one or more of the other flexible components. In contrast to the window/cover component 2 in this embodiment, each flexible component laminated to the window/cover component has a flat resting configuration (each flexible component tends to adopt a substantially flat configuration in the absence of any mechanical external forces applied thereto). Each lamination involves taking a component or a pre-laminated combination of components in a flat resting configuration, laminating the component or component combination in a flexed, stressed configuration directly or indirectly to the curved window/cover component 2. Adhesive pre-applied to a surface of the component or component combination and/or to the surface to which the component or component combination is laminated secures the component or component combination in a flexed, stressed configuration (directly or indirectly) to the curved window/cover component 2. The resulting assembly has a curved resting configuration, but each flexible component of the assembly is in a stressed configuration.

In this example embodiment, the encapsulation films 4, 8 are larger than the polarisers and LC cell of module 6, and both extend beyond the edges of the module 6 on all sides.

In this embodiment, the second encapsulation film 8 has a smaller size than the first encapsulation film 4 such that the edge of the second encapsulation film 8 is located inwards of the edge of the first encapsulation film 4, in all edge regions of the first encapsulation film. This under-sizing of the second encapsulation film 8 facilitates the deposition of an edge sealant material (not shown) to extend by capillary action between the first and second encapsulation films to a location where cutting is to be performed, as discussed later. Adhesive to secure the two encapsulation films 4, 8 together is limited to regions inwards of the cutting regions to allow the sealant to occupy the cutting regions. After curing the edge sealant in situ between the two encapsulation films 4, 8, the edge sealant acts to protect the module 6 (including the LC cell and polarisers) against the ingress of one or more damaging air species via the interface between the encapsulation films 4, 8.

Figure 2:
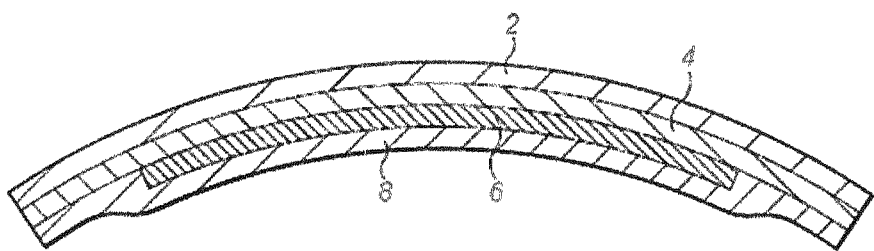
FIG. 2 illustrates the curved assembly of FIG. 1 after cutting according to an embodiment of the present invention.

After all components 4, 6, 8 are secured by said layers of adhesive in flexed, stressed, curved configurations to the curved window/cover component 2, cuts are made (in regions where the above-mentioned edge sealant is located) through all of the window/cover component 2 and the encapsulation films 4, 8. The cuts are made (at least) in the two opposing edge regions extending parallel to the curvature axis (as shown by the dotted cut lines in FIG. 1), to produce aligned edges in the curved window/cover component 2 and the encapsulation films 4, 8, as shown in FIG. 2. The cutting may, for example, be performed using a laser cutter. This production of aligned edges in these components while the laminated assembly as a whole is in a curved resting configuration (or a curved configuration very close to the curved resting configuration) reduces the risk of delamination of the stressed laminated components from one another, particularly in the event that the assembly is later flexed away from its curved resting configuration.

After cutting, the assembly may then be mounted on a backlight unit, which may, for example, comprise a support structure have a curved outer surface defining in said curved outer surface a recess for housing a backlight module comprising edge light-emitting diodes (LEDs) and a light guide plate to direct and distribute light from the edge LEDs out from an upper surface of the light guide plate substantially uniformly across the whole area of the light guide plate. If the backlight module has a flat resting configuration, a diffuser sheet may be secured to the curved surface of the support structure to retain the backlight module in a curved stressed configuration within said recess.

The curved outer surface of the backlight module may have a radius of curvature smaller than the radius of curvature of the assembly shown in FIG. 2, and the mounting of the assembly of FIG. 2 on the backlight module may involve some flexing of the assembly away from its curved resting configuration. As mentioned above, the technique described above of producing aligned edges in the window/cover component 2 and the encapsulation films 4, 8 will serve to reduce the risk of delamination of these components from one another when the assembly is flexed away from its curved resting configuration.

In the embodiment described above, the window/cover component 2 has a curved resting configuration (as a result of e.g. thermoforming). According to one variation, the window/cover component 2 has a flat resting configuration, and is held in a curved stressed configuration during the lamination processes by the rigid carrier, mentioned above. After the laminations are completed, all flexible components (including the window/cover component 2) are held in stressed, curved configurations by the adhesive between each pair of flexible components.

According to another variation, the window/cover component 2 has a curved resting configuration, and is sufficiently rigid to carry out the laminations without the need for a rigid carrier to support the window/cover component 2.

The embodiment shown in FIGS. 1 and 2 involves cutting solely at outer edges of the assembly. However, according to one variation, the module 6 (polarisers+LC cell) may define one or more holes, and the window/cover component 2 and encapsulation films 4, 8 are also cut through in the regions of the one or more holes to additionally produce aligned inner edges in these three components.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

The invention claimed is:

1. A method, comprising: forming a flexible assembly including a stack of layers defining electrical control circuitry for a sensor or display, wherein the flexible assembly has a curved configuration and comprises at least first and second components laminated together in stressed configurations; and while the assembly is in the curved configuration, cutting through at least the at least first and second components to produce one or more aligned edges in the at least first and second components; wherein, before the cutting, the second component has a smaller size than the first component such that an outer edge of the second component is located inwards of an outer edge of the first component.

2. The method according to claim 1, wherein forming the flexible assembly comprises laminating the first component to a third flexible component in a curved configuration, and then laminating the second component to the first component in situ on the third component.

3. The method according to claim 1, wherein forming the flexible assembly comprises laminating the first component to the second component, and laminating the first component to a third component in a curved configuration, with the second component laminated to the first component.

4. The method according to claim 2, wherein the cutting comprises cutting through also the third component.

5. The method according to claim 2, wherein the third component comprises a flexible window/cover component.

6. The method according to claim 5, wherein the flexible assembly comprises a liquid crystal cell interposed between two orthogonal polariser films.

7. The method according to claim 6, wherein the first and second components comprise two encapsulation films between which the liquid crystal cell and polariser films are interposed, and wherein the cutting comprises cutting at least through the two encapsulation films and the window/cover component to produce aligned edges in at least the two encapsulation films and the window/cover component.

8. The method according to claim 1, wherein the flexible assembly comprises a liquid crystal cell interposed between two orthogonal polariser films.

9. The method according to claim 1, comprising mounting the flexible assembly on a component.

10. The method according to claim 9, wherein the flexible assembly has a first radius of curvature in the curved configuration, and the component has a second radius of curvature smaller than the first radius of curvature.

11. The method according to claim 10, wherein mounting the flexible assembly on the component comprises flexing the flexible assembly away from the curved configuration.

12. The method according to claim 1, comprising flexing the flexible assembly away from the curved configuration.

13. The method according to claim 1, wherein the first and second components both have a larger size than a flexible module between the first and second components, such that an outer edge of the flexible module is inwards of the outer edge of the first component and inwards of the outer edge of the second component.

14. The method according to claim 1, comprising, after the forming the flexible assembly and before the cutting, depositing an edge sealant material such that the edge sealant material extends by capillary action between the first and second components to a location; and wherein the cutting comprises cutting at the location.

15. The method according to claim 14, wherein the flexible assembly comprises adhesive between the first and second components; and wherein the adhesive is limited to one or more regions inwards of the location.

16. A method, comprising: forming a flexible assembly including a stack of layers defining electrical control circuitry for a sensor or display, wherein the flexible assembly has a curved configuration and comprises at least first and second components laminated together in stressed configurations; and while the assembly is in the curved configuration, cutting through at least the at least first and second components to produce one or more aligned edges in the at least first and second components, wherein the flexible assembly comprises edge sealant material at one or more regions between the first and second components, and wherein the cutting comprises cutting at the one or more regions.

17. A method, comprising: forming a flexible assembly including a stack of layers defining electrical control circuitry for a sensor or display, wherein the flexible assembly has a curved configuration and comprises at least first and second components laminated together in stressed configurations; and while the assembly is in the curved configuration, cutting through at least the at least first and second components to produce one or more aligned edges in the at least first and second components, wherein the cutting is performed in one or more cutting regions; and wherein the flexible assembly comprises an adhesive between the first and second components to secure the first and second components together, and wherein the adhesive is limited to regions inwards of the one or more cutting regions.

18. The method according to claim 17, wherein the flexible assembly comprises a flexible module between the first and second components; wherein the first and second components both have a larger size than the module between the first and second components, such that an outer edge of the flexible module is inwards of an outer edge of the first component and inwards of an outer edge of the second component; and wherein the cutting regions are outwards of the outer edge of the flexible module.

19. The method according to claim 1, wherein the flexible assembly comprises a flexible module between the first and second components; wherein the module defines one or more holes in one or more regions; and wherein the cutting comprises cutting through the first and second components in the one or more regions of the one or more holes.

* * * * *